United States Patent
Hong et al.

(10) Patent No.: US 11,718,720 B2
(45) Date of Patent: Aug. 8, 2023

(54) COMPOSITE CELLULOSE NANOSHEET WITH EXCELLENT TRANSPARENCY AND STRENGTH AND MANUFACTURING METHOD THEREOF

(71) Applicants: Hyundai Motor Company, Seoul (KR); Kia Motors Corporation, Seoul (KR); University-Industry Cooperation Group of Kyung Hee University, Gyeonggi-do (KR)

(72) Inventors: Chae Hwan Hong, Seoul (KR); Jin Woo Choung, Gyeonggi-do (KR); Jungmok You, Gyeonggi-do (KR); Kangyun Lee, Gyeonggi-do (KR); Youngho Jun, Seoul (KR); Dabum Kim, Gyeonggi-do (KR); Goo Min Kwon, Gyeonggi-do (KR)

(73) Assignees: Hyundai Motor Company, Seoul (KR); Kia Motors Corporation, Seoul (KR); University-Industry Cooperation Group of Kyung Hee University, Gyeonggi-do (KR)

(*) Notice: Subject to any disclaimer, the term of this patent is extended or adjusted under 35 U.S.C. 154(b) by 269 days.

(21) Appl. No.: 17/064,169

(22) Filed: Oct. 6, 2020

(65) Prior Publication Data
US 2021/0355289 A1    Nov. 18, 2021

(30) Foreign Application Priority Data
May 13, 2020   (KR) .................. 10-2020-0057226

(51) Int. Cl.
| | | |
|---|---|---|
| *C08J 5/18* | (2006.01) | |
| *C08L 1/02* | (2006.01) | |
| *C08J 5/00* | (2006.01) | |
| *C08J 3/07* | (2006.01) | |
| *C08K 5/00* | (2006.01) | |
| *C08K 5/1515* | (2006.01) | |
| *C08K 3/011* | (2018.01) | |
| *C08K 3/20* | (2006.01) | |
| *C08K 7/02* | (2006.01) | |
| *C08B 15/10* | (2006.01) | |
| *B82Y 30/00* | (2011.01) | |
| *B82Y 40/00* | (2011.01) | |

(52) U.S. Cl.
CPC .................. *C08J 5/18* (2013.01); *C08B 15/10* (2013.01); *C08J 3/07* (2013.01); *C08J 5/005* (2013.01); *C08K 3/011* (2018.01); *C08K 3/20* (2013.01); *C08K 5/0025* (2013.01); *C08K 5/1515* (2013.01); *C08K 7/02* (2013.01); *C08L 1/02* (2013.01); *B82Y 30/00* (2013.01); *B82Y 40/00* (2013.01); *C08J 2301/02* (2013.01); *C08K 2201/005* (2013.01); *C08K 2201/011* (2013.01); *C08L 2201/54* (2013.01); *C08L 2203/16* (2013.01); *C08L 2205/16* (2013.01); *C08L 2312/00* (2013.01)

(58) Field of Classification Search
CPC ...... C08J 5/18; C08J 5/005; C08J 3/07; C08B 15/10; C08L 1/02; B82Y 30/00; C08K 5/1515; C08K 3/011; C08K 3/20; C08K 7/02; C08K 5/0025
USPC ........................................................ 428/534
See application file for complete search history.

(56) References Cited

U.S. PATENT DOCUMENTS

2014/0228487 A1* 8/2014 Shimizu ................ C08K 5/523
                                                          524/37

* cited by examiner

*Primary Examiner* — Hui H Chin
(74) *Attorney, Agent, or Firm* — Fox Rothschild LLP

(57) ABSTRACT

Disclosed are a composite cellulose nanosheet with excellent transparency and strength and manufacturing method thereof. The manufacturing method of a composite cellulose nanosheet includes: preparing a dispersion including a cellulose nanofiber and a cellulose nanocrystal; preparing a nanosheet support with the dispersion; contacting the nanosheet support with a crosslinking agent; and placing the nanosheet support that has contacted the crosslinking agent between two sheets of barrier materials such as two sheets of glass plate.

13 Claims, 3 Drawing Sheets

FIG. 1

```
┌─────────────────────────────────────────┐
│    PREPARING A DISPERSION BY MIXING     │
│       A CELLULOSE NANOFIBER AND         │
│        A CELLULOSE NANOCRYSTAL          │
└─────────────────────────────────────────┘
                    ⬇
┌─────────────────────────────────────────┐
│       PREPARING A WET NANOSHEET         │
│   SUPPORT BY FILTERING THE DISPERSION   │
└─────────────────────────────────────────┘
                    ⬇
┌─────────────────────────────────────────┐
│ CROSSLINKING THE CELLULOSE NANOFIBER AND│
│       THE CELLULOSE NANOCRYSTAL BY      │
│        IMMERSING THE WET NANOSHEET      │
│  SUPPORT IN A CROSSLINKING AGENT SOLUTION│
└─────────────────────────────────────────┘
                    ⬇
┌─────────────────────────────────────────┐
│    PLACING THE WET NANOSHEET SUPPORT    │
│   BETWEEN TWO SHEETS OF GLASS PLATE AND │
│         THEN PRESSING AND DRYING        │
│         THE WET NANOSHEET SUPPORT       │
└─────────────────────────────────────────┘
```

COMPOSITE CELLULOSE NANOSHEET WITH EXCELLENT TRANSPARENCY AND STRENGTH AND MANUFACTURING METHOD THEREOF

CROSS-REFERENCE TO RELATED APPLICATION

This application is based on and claims priority under 35 U.S.C. § 119 to Korean Patent Application No. 10-2020-0057226, filed on May 13, 2020 in the Korean Intellectual Property Office, the disclosure of which is incorporated herein by reference.

TECHNICAL FIELD

The invention relates to a composite cellulose nanosheet with excellent transparency and strength and a method of manufacturing thereof.

BACKGROUND

Glass is transparent, strong, and has a low coefficient of thermal expansion, so it is used throughout real life and industry. However, there is a fatal disadvantage that glass is easily broken. Optical materials to replace glass include various plastic materials such as polycarbonate (PC), polymethylmethacrylate (PMMA), and polyethylene terephthalate (PET), but they are not as strong as glass, are easily deformed, and have disadvantages of poor thermal stability, making it difficult to replace glass.

In order to reduce the disadvantages of these plastic materials, the development of a reinforced plastic composite material using transparent glass fiber reinforcement has been made. The reinforced plastic composite material can replace glass because of its strength and low thermal expansion rate comparable to that of glass. However, the plastic composite material has a different refractive index between the glass fiber and the transparent resin in the visible light region, and has poor surface flatness, resulting in poor turbidity characteristics. As a result of the drop in turbidity, the transmitted light spreads out, so there is a limit to being used as an optical material.

SUMMARY

In preferred aspects, provided is a composite cellulose nanosheet with excellent transparency and strength and a manufacturing method thereof.

In an aspect, a manufacturing method of a composite cellulose nanosheet. The method may include: preparing a dispersion including a cellulose nanofiber and a cellulose nanocrystal; preparing a nanosheet support with the dispersion; contacting the nanosheet support with a crosslinking agent, for example to thereby crosslink the cellulose nanofiber and the cellulose nanocrystal and placing the nanosheet support that has been contacted with the crosslinking agent between two sheets of barrier material such as two sheets of glass plate. Such as sandwich of nanosupport support and barrier material then may be pressed and/or dried.

A term "nanosheet" as used herein refers to a two-dimensional nanostructure having a sheet-like structure with a thickness in nanometer scale, without any limitation to an area of the planar surface of the sheet. The thickness of the exemplary nanosheet ranges from about 1 to 999 nm, from about 1 to 900 nm, from about 1 to 800 nm, from about 1 to 700 nm, from about 1 to 600 nm, from about 1 to 500 nm, from about 1 to 400 nm, from about 1 to 300 nm, from about 1 to 200 nm, from about 1 to 100 nm, or from about 1 to 50 nm.

A term "nanocrystal" as used herein refers to a particular or crystalized material having at least one dimension of the particle in nanometer scale. Typically, a diameter of the particle is measured by maximal distance of two points of the particle. Preferably, the diameter of the exemplary nanocrystal ranges from about 1 to 999 nm, from about 1 to 900 nm, from about 1 to 800 nm, from about 1 to 700 nm, from about 1 to 600 nm, from about 1 to 500 nm, from about 1 to 400 nm, from about 1 to 300 nm, from about 1 to 200 nm, from about 1 to 100 nm, from about 1 to 50 nm, or from about 1 to 10 nm. A term cellulose as used herein refers to a polysaccharide having a formula of $(C_6H_{10}O_5)_n$, which includes D-glucose units connected via $\beta$ (1-4) linkages so as to have linear chains of the glucose units. The cellulose may include a naturally obtained compound, synthetic compound, or derivatives thereof.

The cellulose nanofiber suitably may be prepared for example by tempo-oxidizing treatment.

The diameter of the cellulose nanofiber suitably may be for example about 2 nm to 15 nm and the length of the cellulose nanofiber may be about 1 μm or less.

The cellulose nanocrystal may be suitably prepared for example by acid hydrolysis treatment.

The diameter of the cellulose nanocrystal suitably may be for example about 2 nm to 5 nm and the length of the cellulose nanocrystal may be about 300 nm or less.

A weight ratio between the cellulose nanofiber and the cellulose nanocrystal may be about 99.8:0.2 to 90:10.

The crosslinking agent may suitably include epichlorohydrin and sodium hydroxide solution of about 1M to 2M.

The crosslinking may include: reacting glucose units in the wet nanosheet support and the epichlorohydrin at a molecular ratio of about 1:0.5 to 1:2.5 during crosslinking reaction.

In an aspect, provided is a composite cellulose nanosheet with excellent transparency and strength. The composite cellulose nanosheet may include: a nanosheet support in which cellulose nanofiber and cellulose nanocrystal are cross-linked; and two glass plates disposed with the nanosheet support interposed there between.

The nanosheet support may include the structure of the following formula (1):

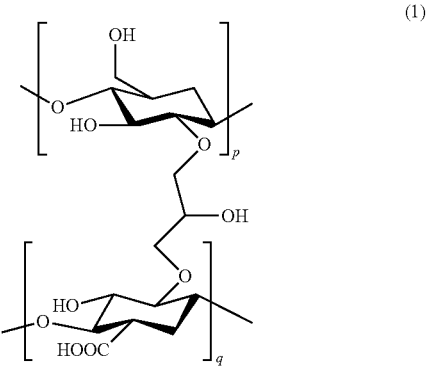

wherein each p and 1 is an integer.

The composite cellulose nanosheet may suitably have a thickness of about 20 μm to 200 μm.

The composite cellulose nanosheet may suitably have a transmittance of 60% or greater in the wavelength region of 360 nm to 740 nm.

The composite cellulose nanosheet may suitably have a tensile strength of about 180 MPa or greater.

BRIEF DESCRIPTION OF THE DRAWINGS

These and/or other aspects of the invention will become apparent and more readily appreciated from the following description of the embodiments, taken in conjunction with the accompanying drawings of which:

FIG. 1 is a flowchart illustrating an exemplary manufacturing method of an exemplary composite cellulose nanosheet with excellent transparency and strength according to an exemplary embodiment of the present invention.

DETAILED DESCRIPTION

Figure 2:
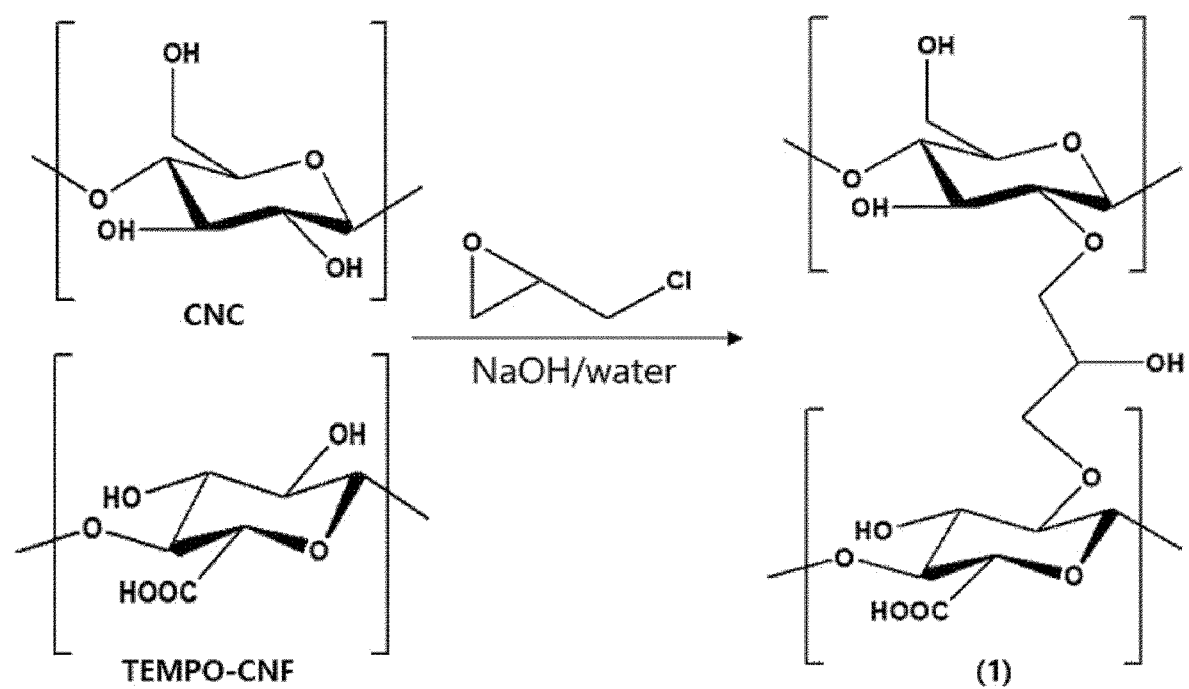
FIG. 2 shows an exemplary crosslinking reaction according to an exemplary embodiment of the present invention.

Hereinafter, preferred embodiments of the present invention will be described. However, the embodiments of the present invention may be modified into various other forms, and the technical idea of the present invention is not limited to the embodiments described below. Further, the embodiments of the present invention are provided to more fully explain the present invention to those skilled in the art.

The terms used in the present application are used only to illustrate specific examples. Thus, for example, the expression of the singular includes plural expressions unless the context clearly dictates otherwise. In addition, the terms "include" or "have," and the like used in the present application are used to specifically denote the presence of stated features, steps, functions, elements, or combinations thereof and the like, and are not used to preparatorily preclude the presence of elements, steps, functions, components, or combinations thereof.

Unless defined otherwise, all terms used herein should be interpreted to have the same meaning as commonly understood by one of ordinary skill in the art to which this invention belongs. Thus, unless explicitly defined herein, certain terms should not be construed in an overly ideal or formal sense.

It should also be understood that the terms "about," "substantially," and the like in the present specification are used in the numerical value or in the vicinity of the numerical value in the meanings mentioned when inherent manufacturing and material allowable errors are presented, and are used to prevent conscienceless intruders from unreasonably using the accurate or absolute numbers, disclosed in the present invention to help understanding of the present invention.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

FIG. 1 is a flowchart illustrating an exemplary manufacturing method of an exemplary composite cellulose nanosheet with excellent transparency and strength according to an exemplary embodiment of the present invention. A manufacturing method of a composite cellulose nanosheet with excellent transparency and strength according to an exemplary embodiment of present invention may include preparing a dispersion including a cellulose nanofiber (CNF) and a cellulose nanocrystal (CNC), e.g., by mixing, preparing a nanosheet support by filtering the dispersion, crosslinking the cellulose nanofiber and the cellulose nanocrystal by contacting (e.g. immersing) the nanosheet support in a crosslinking agent and placing the wet nanosheet support between two sheets of barrier material such as glass plate and then preferably pressing and drying.

Preparing a Dispersion by Mixing a Cellulose Nanofiber (CNF) and a Cellulose Nanocrystal (CNC)

The cellulose nanofiber may be prepared by tempo-oxidizing treatment. Tempo-oxidizing treatment may be an oxidation reaction treatment using 2,2,6,6-tetramethylpiperidin-1-oxyl (2,2,6,6-tetramethylpiperidin-1-oxyl, TEMPO) radical as a catalyst. The cellulose nanofiber prepared by tempo-oxidizing treatment may have a finer fiber size compared to the general cellulose nanofiber. Preferably, the cellulose nanofiber may have a diameter of about 2 nm to 15 nm and a length of about 1 μm or less. When the nanosheet is manufactured using such fine fibers, the strength of the nanosheet can be improved.

The cellulose nanocrystal may be prepared by acid hydrolysis. Acid hydrolysis treatment can be performed by acid hydrolysis treatment by immersing microcrystalline cellulose in a sulfuric acid solution. When the acid hydrolysis treatment is performed, the noncrystalline region in the cellulose may be removed, leaving only the crystalline region, so that a cellulose nanocrystal having a fine size may be prepared. The cellulose nanocrystal prepared by acid hydrolysis treatment may have a smaller size than that of a general cellulose nanocrystal. According to an example, the cellulose nanocrystal may have a diameter of about 2 nm to 5 nm and a length of about 300 nm or less. When a nanosheet is manufactured using such a fine crystal, the strength of the nanosheet may be improved.

In the step of preparing dispersion by mixing cellulose nanofiber and cellulose nanocrystal, cellulose nanofiber dispersion and cellulose nanocrystal dispersion may be mixed. For example, the cellulose nanofiber and the cellulose nanocrystal may be mixed in a weight ratio of about 99.8:0.2 to 90:10. The amount of cellulose nanofiber dispersion may be about 1 ml to 30 ml, and the amount of cellulose nanocrystal mixed therewith may be appropriately adjusted according to physical properties.

Step of Preparing a Nanosheet Support by Filtering the Dispersion

According to the present invention, a nanosheet support can be prepared by filtering dispersion by mixing cellulose nanofiber and cellulose nanocrystal.

The dispersion prepared may have an alkaline property. Accordingly, a filtration membrane made of polytetrafluoroethylene (PTFE) material that is resistant to alkaline solutions may be preferably used when filtering the dispersion. At this time, the pores of the membrane may preferably be about 0.05 μm to 0.15 μm.

Step of Crosslinking the Cellulose Nanofiber and the Cellulose Nanocrystal by Immersing the Wet Nanosheet Support in a Crosslinking Agent Solution A nanosheet support prepared by filtering dispersion may be contacted (e.g. immersed) with a crosslinking agent to perform a crosslinking reaction between the cellulose nanofiber and the cellulose nanocrystal.

For example, epichlorohydrin (ECH) may be used as the crosslinking agent, and an alkaline environment may be required for smooth crosslinking reaction between cellulose nanofibers and cellulose nanocrystals by epichlorohydrin. Preferably, the crosslinking agent solution may be a solution including epichlorohydrin and 1M to 2M sodium hydroxide solution.

The time for contacting the nanosheet support in the crosslinking agent so that the crosslinking reaction can be sufficiently performed may be about 10 minutes to 12 hours.

The glucose unit in the nanosheet support and the epichlorohydrin may be reacted in a molecular ratio of about 1:0.5 to 1:2.5 during crosslinking reaction.

In the crosslinking reaction, the cellulose nanofiber and the cellulose nanocrystal may be cross-linked by epichlorohydrin, a crosslinking agent. FIG. 2 shows an exemplary crosslinking reaction. In FIG. 2, CNC means cellulose nanocrystal, and TEMPO-CNF means tempo-oxidized cellulose nanofiber. As a result of crosslinking reaction between cellulose nanofiber and cellulose nanocrystal by epichlorohydrin, the wet nanosheet support may include the structure of formula (1).

Figure 3:
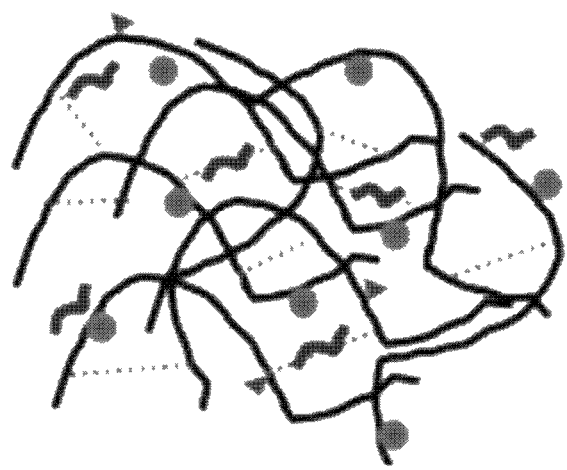
FIG. 3 shows an exemplary wet nanosheet support in which a crosslinking reaction is completed according to an exemplary embodiment of the present invention.

FIG. 3 shows an exemplary wet nanosheet support in which a crosslinking reaction according to the present invention is completed. In FIG. 3, CNC means cellulose nanocrystal, TEMPO-CNF means tempo-oxidized cellulose nanofiber, and ECH means epichlorohydrin.

Preferably, the nanosheet support may be removed after the crosslinking reaction is completed from the crosslinking agent in order to prevent deterioration of transparency, and then rinsed with preferably with distilled water to substantially or completely wash off the residual sodium hydroxide solution.

Step of Placing the Wet Nanosheet Support Between Two Sheets of Glass Plate and then Pressing and Drying.

The nanosheet support after the crosslinking reaction is completed may be placed between two barrier materials such as glass plates, then preferably pressed and dried to prepare a composite cellulose nanosheet. In the process of drying the nanosheet, moisture may escape and the shape of the nanosheet support may be distorted. Therefore, it is preferable to compress and then dry it.

The composite cellulose nanosheet with excellent transparency and strength may be manufactured described herein may include a nanosheet support in which cellulose nanofiber and cellulose nanocrystal are cross-linked, and two barrier laters (e.g. glass plates) disposed with the nanosheet support interposed there between.

For example, composite cellulose nanosheet may include the structure of formula (1) below.

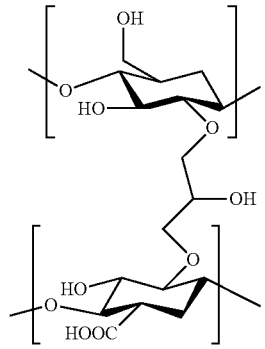

(1)

The composite cellulose nanosheet may suitably have a thickness of about 20 μm to 200 μm.

The composite cellulose nanosheet may have excellent transparency, and may suitably have a transmittance of about 60% or greater in a wavelength region of 360 nm to 740 nm, which is a visible light region.

The composite cellulose nanosheet may have excellent strength, and may suitably have a tensile strength of about 180 MPa or greater.

The composite cellulose nanosheet can secure both excellent transparency and strength. The composite cellulose nanosheet may suitably have a transmittance of about 60% or greater and a tensile strength of about 180 MPa or greater in a wavelength region of 360 nm to 740 nm, which is a visible light region.

Hereinafter, the present invention will be described in more detail through examples. However, it should be noted that the following examples are for illustrative and more detailed description of the present invention, and not for limiting the scope of the present invention. This is because the scope of the present invention is determined by the matters described in the claims and the matters reasonably inferred therefrom.

EXAMPLE

Preparation of Inventive Example 1

(a) A uniformly dispersed dispersion was prepared by mixing 100 ml of tempo-oxidized cellulose nanofiber dispersion and 10 ml of cellulose nanocrystal dispersion. Then, the prepared dispersion was filtered to prepare a wet nanosheet support.

(b) In the filtration process, a membrane made of polytetrafluoroethylene (PTFE) having a pore size of 0.1 μm was used as a filtering substrate, and the filtering substrate was wetted in distilled water and placed on a vacuum filter. Then, 110 ml of dispersion was poured onto the membrane, a vacuum atmosphere was formed using a pump, and filtration was started.

(c) The wet nano-support prepared by the filtration process was immersed in a mixture of 25 ml of 2M NaOH solution and 20 μl of epichlorohydrin solution, and impregnated and reacted for 6 hours.

(d) The wet nano-support having completed the reaction was placed between two glass plates, pressed in a dry oven at a temperature of 60° C. for 3 hours, and dried to prepare a composite cellulose nanosheet.

Preparation of Inventive Example 2

(a) tempo-oxidized cellulose nanofiber dispersion and cellulose nanocrystal dispersion were mixed in a volume ratio of 10:3 to prepare a uniformly dispersed 110 ml of dispersion. (c) Instead of the 20 µl of the epichlorohydrin solution of Inventive Example 1, 50 µl of the epichlorohydrin solution was mixed, and impregnation and reaction were performed for 12 hours instead of 6 hours. Steps (b) and (d) were prepared under the same conditions as in Invention Example 1.

Preparation of Comparative Example 1

(a) Only 110 ml of tempo-cellulose nanofiber dispersion was filtered to prepare dispersion. (c) 50 µl of epichlorohydrin solution was mixed instead of the 20 µl epichlorohydrin solution of Inventive Example 1. In Comparative Example 1, a nanosheet support was formed without the effect of enhancing physical properties of the cellulose nanocrystal, and a separate crosslinking reaction was not performed. Steps (b) and (d) were prepared under the same conditions as in Invention Example 1.

Preparation of Comparative Example 2

Comparative Example 2 was prepared by omitting the step (c) of Inventive Example 1. A composite cellulose nanosheet was prepared while the crosslinking reaction by the epichlorohydrin solution was omitted.

The manufacturing process conditions of each of the inventive examples and comparative examples are summarized in Table 1 below.

TABLE 1

| | Inventive Example 1 | Inventive Example 2 | Comparative Example 1 | Comparative Example 2 |
|---|---|---|---|---|
| (a) | 10:1 | 10:3 | 10:0 | 10:1 |
| (b) | PTFE material membrane/0.1 µm size pore condition 110 ml of mixed cellulose nanofiber dispersion/Pour on top of membrane and vacuum condition | PTFE material membrane/0.1 µm size pore condition 110 ml of mixed cellulose nanofiber dispersion/Pour on top of membrane and vacuum condition | PTFE material membrane/0.1 µm size pore condition 110 ml of mixed cellulose nanofiber dispersion/Pour on top of membrane and vacuum condition | PTFE material membrane/0.1 µm size pore condition 110 ml of mixed cellulose nanofiber dispersion/Pour on top of membrane and vacuum condition |
| (c) | mixture of 25 ml of NaOH (2M) solution and 20 µl of epichlorohydrin solution 6 hr | mixture of 25 ml of NaOH (2M) solution and 50 µl of epichlorohydrin solution 12 hr | mixture of 25 ml of NaOH (2M) solution and 50 µl of epichlorohydrin solution 6 hr | — (no processing) (no processing) |
| (d) | Dry oven at 60° C./3 hr | Dry oven at 60° C./3 hr | Dry oven at 60° C./3 hr | Dry oven at 60° C./3 hr |

The transmittance, appearance, and strength of each Inventive Example and Comparative Example prepared according to the above-described process were evaluated. The evaluation results are shown in Table 2 below.

The light transmittance was measured in a wavelength range of 360 nm to 740 nm, which is a visible light range, using a spectrophotometer CM-5 of KONIA MINOLTA.

Appearance evaluation is the result of visually evaluating the flatness of the outer surface and the presence or absence of micropores. When evaluated with the naked eye, if the flatness of the surface is uniform and there are no micropores, it is expressed as 'good', otherwise it is expressed as 'poor'.

TABLE 2

| | Inventive Example 1 | Inventive Example 2 | Comparative Example 1 | Comparative Example 2 |
|---|---|---|---|---|
| light transmittance | 65% | 65% | 65% | 70% |
| appearance evaluation | good | good | poor | poor |
| tensile strength (MPa) | 190 | 180 | 150 | 175 |

The composite cellulose nanosheets of Inventive Examples 1 and 2 had excellent transparency and transmittance of 60% or greater in a wavelength region of 360 nm to 740 nm, which is a visible light region. In addition, the composite cellulose nanosheets of Inventive Examples 1 and 2 had good appearance in appearance evaluation, and had excellent tensile strength of 180 MPa or greater.

On the other hand, Comparative Examples 1 and 2 had poor appearance in appearance evaluation, and formed a nanosheet support without performing a crosslinking reaction, so that the effect of enhancing physical properties by the cellulose nanocrystal was not achieved. As a result, Comparative Examples 1 and 2 only secured tensile strength of less than 180 MPa, but did not sufficiently secure the target strength.

According to various exemplary embodiments of the present invention, a composite cellulose nanosheet having excellent transparency having a transmittance of 60% or greater in a visible light region can be provided.

According to various exemplary embodiments of the present invention, a composite cellulose nanosheet having excellent strength having a tensile strength of 180 MPa or greater can be provided.

In particular, according to various exemplary embodiments of the present invention, a composite cellulose nanosheet excellent in both transparency and strength can be provided. These properties are important industrial advantages for optical materials capable of bending.

The exemplary embodiments disclosed with reference to the accompanying drawings and tables have been described above. It will be understood by those of ordinary skill in the art that various changes in form and details may be made therein without departing from the spirit and scope of the present invention as defined by the following claims. The disclosed embodiments are illustrative and should not be construed as limiting.

What is claimed is:

1. A manufacturing method of a composite cellulose nanosheet with excellent transparency and strength, comprising:
preparing a dispersion by mixing a cellulose nanofiber and a cellulose nanocrystal;
preparing a wet nanosheet support by filtering the dispersion;
crosslinking the cellulose nanofiber and the cellulose nanocrystal by immersing the wet nanosheet support in a crosslinking agent solution; and
placing the wet nanosheet support between two sheets of glass plate and then pressing and drying.

2. The manufacturing method according to claim 1, wherein the cellulose nanofiber is prepared by tempo-oxidizing treatment.

3. The manufacturing method according to claim 2, wherein the diameter of the cellulose nanofiber is 2 nm to 15 nm, the length of the cellulose nanofiber is 1 μm or less.

4. The manufacturing method according to claim 1, wherein the cellulose nanocrystal is prepared by acid hydrolysis treatment.

5. The manufacturing method according to claim 4, wherein the diameter of the cellulose nanocrystal is 2 nm to 5 nm, the length of the cellulose nanocrystal is 300 nm or less.

6. The manufacturing method according to claim 1, wherein the cellulose nanofiber and the cellulose nanocrystal are mixed in a weight ratio of 99.8:0.2 to 90:10.

7. The manufacturing method according to claim 1, wherein the crosslinking agent solution is a solution obtained by mixing epichlorohydrin with 1 M to 2 M sodium hydroxide solution.

8. The manufacturing method according to claim 7, wherein the crosslinking comprises:
reacting the glucose unit in the wet nanosheet support and the epichlorohydrin at a molecular ratio of 1:0.5 to 1:2.5 during crosslinking reaction.

9. A composite cellulose nanosheet with excellent transparency and strength, comprising:
a nanosheet support in which cellulose nanofiber and cellulose nanocrystal are cross-linked; and
two glass plates disposed with the nanosheet support interposed therebetween.

10. The composite cellulose nanosheet according to claim 9, wherein the nanosheet support comprises the structure of the following formula (1):

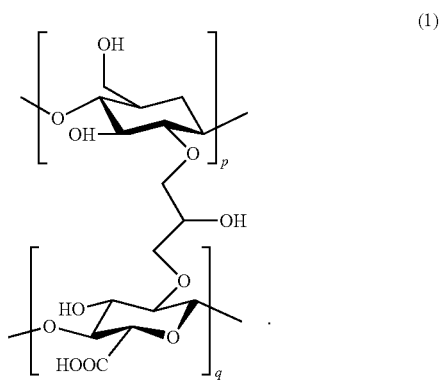

wherein each p and q is an integer.

11. The composite cellulose nanosheet according to claim 9, wherein the composite cellulose nanosheet has a thickness of 20 μm to 200 μm.

12. The composite cellulose nanosheet according to claim 9, wherein the composite cellulose nanosheet has a transmittance of 60% or more in the wavelength region of 360 nm to 740 nm.

13. The composite cellulose nanosheet according to claim 9, wherein
the composite cellulose nanosheet has a tensile strength of 180 MPa or more.

* * * * *